3,515,665
Patented June 2, 1970

3,515,665
CONTINUOUS LOW PRESSURE CATALYTIC REFORMING PROCESS WITH WATER AND AMMONIA EXCLUSION AND PROGRAMMED SULFUR ADDITION
John C. Hayes, Palatine, Ill., assignor to Universal Oil Products Company, Des Plaines, Ill., a corporation of Delaware
No Drawing. Continuation-in-part of application Ser. No. 560,903, June 27, 1966. This application July 17, 1969, Ser. No. 842,713
Int. Cl. C10g *35/08*
U.S. Cl. 208—138                    9 Claims

ABSTRACT OF THE DISCLOSURE

An improved method of operation is provided for a catalytic, low pressure process for continuously reforming a hydrocarbon charge stock boiling in the gasoline range for a catalyst life of about 15 barrels of charge per pound of catalyst without catalyst regeneration. In this process the charge stock, hydrogen, and a sulfur or sulfur-containing compound are continuously contacted in a reforming zone with a reforming catalyst containing a platinum component at reforming conditions including a pressure of 50 to 350 p.s.i.g. and an LHSV of 0.1 to 5 hr.$^{-1}$ Moreover, the reforming zone is maintained substantially free of water and of ammonia throughout the reforming process and the sulfur or sulfur-containing compound is continuously introduced into the reforming zone. Improved method of operation involves controlling the amount of sulfur continuously entering the reforming zone according to the following three-step program: first, the process is started-up and lined-out with sulfur entering the reforming zone in an amount selected from the range equivalent to about 1000 to about 5000 wt. p.p.m. of the charge stock; second, the amount of sulfur entering the reforming zone is decreased, during a time period of at least 2 barrels of charge per pound of catalyst to a value equal to about 10 to about 25% of the amount established during the start-up step; and finally, the amount of sulfur entering the reforming zone is thereafter maintained constant as the value attained at the end of the second step.

CROSS-REFERENCES TO RELATED APPLICATIONS

This application is a continuation-in-part of my application entitled "Continuous, Low Pressure Catalytic Reforming Process With Sulfur Inclusion and Water Exclusion," filed June 24, 1968, and assigned Ser. No. 739,201, which, in turn, is a continuation-in-part of my application Ser. No. 560,903, filed June 27, 1966, and now abandoned.

DISCLOSURE

The subject of the present invention is an improved method of operation for a low pressure process for the continuous, catalytic reforming of a hydrocarbon fraction boiling essentially within the gasoline range to produce high yields of a high-octane reformate. More precisely, the present invention relates to the use of programmed sulfur addition in a low pressure, continuous reforming process which is operated with sulfur inclusion and water exclusion in order to achieve a substantial increase in $C_5^+$ yield stability.

The conception of the present invention was a product of a number of recent developments associated with the art of continuous, low pressure reforming systems. The first development involved my finding that the inclusion of sulfur could be extremely beneficial in a low pressure reforming system using a catalyst containing a platinum group component. This finding was in sharp contrast to the traditional teaching in this art that the presence of sulfur is detrimental. Coupled with this development was the recognition of the adverse effects of water on such a sulfur-modified system. Now I have additionally found that for a continuous reforming system operated with sulfur inclusion and water exclusion at a low system pressure, the amount of sulfur continuously entering the reforming zone can be controlled according to a three-step program to effect a further improvement in process stability. More specifically, I have determined that the yield stability of the reforming process can be markedly improved by operating the process with a relatively high amount of sulfur during a start-up period, followed by a second period wherein the amount of sulfur is decreased to a relatively small amount which is about 10 to about 25% of the amount used during the start-up period, and by a final period wherein the amount of sulfur entering the reforming zone is maintained at a constant value equal to this relatively small amount. In essence then, the present invention involves the continuous addition of sulfur to a continuous, low pressure reforming process operated with water and ammonia exclusion, according to a three-step program involving a first period with a relatively high amount of sulfur, a second period with a decreasing amount of sulfur, and a third period with a constant relatively small amount of sulfur.

It is well known in the art that the requirements for an optimum process for transforming low octane stocks into high octane stocks, at minimum loss to undesirable products, involves a specially tailored catalytic environment that is designed to promote upgrading reactions for paraffins and naphthenes, which are the components of gasolines and naphthas that have the highest octane-improving potential. For paraffins the upgrading reactions are: isomerization to more highly branched paraffins, dehydrogenation to olefins, dehydrocyclization to aromatics, and hydrocracking to lower molecular weight paraffins. Of these, the dehydrocyclization reaction is the one that shows the maximum gain in octane number and is, consequently, preferred. For naphthenes, the principal upgrading reactions involve dehydrogenation to aromatics and ring isomerization and dehydrogenation to aromatics; but, the change in octane number is not as dramatic here as in the case of dehydrocyclization of paraffins since the clear research octane number of most naphthenes is in the range of 65 to 80. Accordingly, catalytic reforming operations are designed to provide an optimum mix between the aforementioned reactions, generally employing for this purpose a multi-purpose catalytic composite having at least a metallic dehydrogenation component and an acid-acting component.

It is not, however, to be assumed that the achievement and control of this optimum mix of upgrading reactions is without its problem areas. These, as is true with any complex set of reaction mechanisms, are injected into the picture by the uncontrollable side phenomena that are produced by a myriad of factors that color and complicate the actual operations of such a reforming process. Foremost among these complicating factors are those associated with undesired side reactions. Examples of these side reactions are: demethylation of hydrocarbons to produce methane, ring opening and naphthenes to give straight chain hydrocarbons, excessive hydrocracking of paraffins to yield light gases (i.e., $C_1$ to $C_4$), condensation of aromatics and other components to form carbonaceous deposits on the catalyst, acid-catalyzed polymerization of olefins and other highly reactive components to yield high molecular weight reactants that can undergo further dehydrogenation and thus contribute to the carbonaceous deposits on the catalyst, etc.

A successful reforming operation, therefore, minimizes the effects of these complicating factors by judicious selection of the catalytic environment and process variables for the particular charge stock of interest. But, adding an additional dimension of complexity to the solution of this problem is the interdependence of the set of desired reactions and the set of undesired reactions such that selection of the proper conditions to minimize undesired reactions has a marked effect on the set of desired reactions.

Nowhere is this interdependence more evident than in a "continuous reforming process." By "continuous reforming process," it is meant a reforming process that is operated for a catalyst life of at least 15 barrels of charge per pound of catalyst (abbreviated herein as BPP) without regeneration. As is well recognized in the art, continuous reforming processes are sharply distinguishable from "regenerative" reforming processes because in the latter type of process at least a portion of the catalyst is continuously being regenerated and the catalyst life before regeneration is always substantially less than 1 BPP. Typically, in a regenerative reforming system operated to yield a $C_5$+ reformate near 100 F-1 clear, all of the catalyst in the system is regenerated during every five days of operation. In regenerative reforming, stability is not a problem because of the continuous regeneration capability and the dominating objective in this type of reforming process is selectivity at octane. Because regenerative reforming systems are not directly concerned with minimizing the side reactions that lead to catalyst instability, it is to be understood that the concept of the present invention has no relationship to regenerative reforming. Similarly, the art on regenerative reforming since it is directed at the solution of a different problem has little relevance to continuous reforming systems where the dominating problem is the stability problem. Indeed, it is but a truism to observe that if a regenerative reforming process could be operated in a stable fashion it would cease to require continuous regeneration capability. Hence, the concept of the present invention relates exclusively to continuous reforming systems because in this system it is necessary to suppress undesired side reactions that lead to catalyst deactivation in order to maintain catalyst activity at a high level for a catalyst life of at least 15 BPP.

Because regenerative reforming systems need not be concerned about stability, the universal practice has been to run them at low pressure because of well known short term yield advantages. The term "low pressure" as used herein means about 50 to about 350 p.s.i.g. For some time now, there has been a substantial need for a continuous reforming process that can operate at low pressure without sacrificing either stability or selectivity.

At this point, it is to be carefully noted that a low pressure, continuous reforming process is desired because the two main upgrading reactions mentioned previously—dehydrocyclization of praffins and dehydrogenation of naphthenes—are net producers of hydrogen and as such they are favored by low system pressure.

The principal barrier to low pressure operation in the past has been the effect of low pressure on the previously mentioned catalyst-fouling reactions of condensation and polymeriation which are believed to be the principal reactions involved in carbon or coke formation on the catalyst. It is thought that this carbon formation involves in part certain olefinic and aromatic hydrocarbons which appear to be adsorbed on the surface of the reforming catalyst, particularly at the dehydrogenation and aromatization sites, and that these catalytically active sites are thereby shielded from the materials being processed. Moreover, aromatics and olefinic materials in the presence of a reforming catalyst tend to undergo dehydrogenation, condensation, and polymerization type reactions and to settle on the catalyst and undergo further dehydrogenation until carbonaceous deposits are formed. Low pressures tend to favor these catalyst fouling reactions because insufficient hydrogen is available to suppress these catalyst-fouling reactions which are generally characterized as hydrogen-producers. In addition, a low partial pressure of hydrogen, since it suppresses hydrocracking and hydrogenation tends to allow carbonaceous deposit precursors to collect on the catalyst, whereas ordinarily the high cracking activity and hydrogenation activity of the catalyst would tend to keep the catalyst relatively free of these carbonaceous deposit precursors. In any event, this increase in catalyst-fouling at low pressure results in the decline in catalyst aromatization activity and, if a product of constant quality is desired, it is necessary to compensate for this deactivation. Usually the most direct and inexpensive method for compensating, in a continuous reforming system, involves increasing the reaction temperature. This, in turn, however, leads to the promotion of hydrocracking to a greater extent than dehydrogenation and dehydrocyclization reactions. Hence, greater losses to light gases are encountered and hydrogen consumption goes up and $C_5$+ yield goes down. Furthermore, the rate of catalyst fouling increases dramatically as temperature is increased. Accordingly, prior attempts at operating a continuous reforming process at low pressure have been unsuccessful because of this severe stability problem.

Recently, a number of significant developments have occurred in the field of low pressure, continuous reforming systems. One major discovery involved the finding that, when a controlled quantity of sulfur is continuously introduced into a platinum-containing reforming catalyst environment which is maintained substantially free of water and of ammonia, a reforming process can be designed to take advantage of the beneficial effects of low system pressure while avoiding most of the hereinbefore discussed adverse effects. Apparently, sulfur in the form of hydrogen sulfide acts to inhibit or retard the association reactions that tend to carbonize the catalyst at these low pressure conditions thereby greatly improving process stability. Without the intention of limiting the present invention by this explanation, my view of the mechanism associated with this inhibition of carbon formation by sulfur involves the well known affinity of hydrogen sulfide for the platinum metal sites of the reforming catalyst. Assuming that a typical fresh reforming catalyst has excessive activity for the upgrading reactions of interest and, further, that this excessive activity is reflected in a greater tendency to accelerate association reactions that carbonize the catalyst and produce instability, the sulfur, in the form of hydrogen sulfide, acts to moderate or temporarily poison the activity of the platinum metal sites via an adsorption mechanism. This theory is supported by the fact that catalysts used in a continuous low pressure reforming system which is operated with sulfur inclusion and water exclusion, are invariably found to contain substantially less carbonaceous material at the end of the reforming run than is obtained with a similar catalyst in a like process without the presence of sulfur. I have now determined that as the reforming catalyst accumulates time on stream, the necessity of this moderation of activity by means of the presence of sulfur diminishes. Despite the ability of sulfur to retard the formation of carbonaceous material on the catalyst, these materials do form at a reduced rate and tend to settle on the catalyst and deactivate some of the platinum metal sites. I have determined that by decreasing the amount of sulfur entering the reforming zone at a rate proportioned to this carbon-formation phenomena, the platinum metal sites that have been temporarily poisoned by hydrogen sulfide can be reactivated and used to compensate for the sites that are deactivated by deposition of carbonaceous material. I have determined, accordingly, that if the concentration of sulfur entering the reforming zone is decreased as carbonaceous material builds-up on the catalyst, the increase in activity resulting from the reduced amount of sulfur acts to compensate for the decrease in activity produced by carbonization of the catalyst. In effect then, variations in the amount of sulfur entering the reforming zone provides a convenient means for regulating the activity of the reforming catalyst so that it is more evenly distributed over the duration of the reforming operation. Furthermore, I have observed that it is essential that the amount of sulfur entering the reforming zone not be allowed to fall below a certain minimum value which must be maintained throughout the duration of the reforming operation. That is, there is a minimum amount of sulfur that must continuously enter the reforming zone in order to guard the catalyst against excessive and rapid carbonization at this low pressure condition. In sum, the present invention involves three essential observations for a low pressure, continuous reforming system operated with sulfur inclusion and water exclusion, and these are: first, that a relatively large amount of sulfur entering the reforming zone is beneficial during the initial period when the process is being started-up and lined-out at operating conditions; second, that as the carbon level builds up on the catalyst, a significant improvement in catalyst stability can be achieved by decreasing the amount of sulfur by a substantial fraction during a time period of at least about 2 BPP, and, finally that the amount of sulfur entering the reforming zone should be maintained relatively constant at this reduced level for the remainder of the reforming operation.

It is, accordingly, an object to provide a improvement in a continuous, low pressure reforming process that operates with the continuous addition of sulfur thereto and the substantial exclusions of water and ammonia therefrom. A related object is to provide a method for increasing the stability, particularly the yield stability, of such a process with corresponding increase in catalyst life before regeneration becomes necessary.

In brief summary, the present invention is an improved method for operating a catalytic, low pressure process for continuously reforming a hydrocarbon charge stock boiling in the gasoline range for a catalyst life of at least 15 barrels of charge per pound of catalyst without catalyst regeneration. In this process the hydrocarbon charge stock, hydrogen, and sulfur or a sulfur-containing compound are continuously contacted in a reforming zone with a reforming catalyst containing a platinum group component at reforming conditions including a pressure of about 50 to about 350 p.s.i.g. and a liquid hourly space velocity of about 0.1 to about 5 hr.$^{-1}$. Furthermore, this reforming zone is maintained substantially free of water and of ammonia throughout the reforming operation, and the sulfur or sulfur-containing compound is continuously introduced into the reforming zone both during start-up of the process and thereafter for the duration of the reforming operation. Against this background, my improved method of operation comprises the steps of: (a) starting-up the process in a first period sufficient to line-out the reforming operation and establishing the amount of sulfur continuously entering the reforming zone at a first value selected from the range equivalent to about 1000 to about 5000 wt. p.p.m. of the hydrocarbon charge stock; (b) thereafter decreasing the amount of sulfur entering the reforming zone, during a second period of at least 2 barrels of charge per pound of reforming catalyst (this second period being at least 3 days) to a second value equal to about 10 to about 25% of the first value; and, (c) thereafter, for the duration of the reforming operation, maintaining the amount of sulfur entering the reforming zone at a constant value equal to the second value.

Specific objects and embodiments of the present invention relate to details concerning process conditions used therein, particularly preferred catalysts for use therein, types of charge stocks that can be reformed thereby, and mechanics of the reforming step and product recovery steps associated therewith, etc. These specific objects and embodiments will become evident from the following detailed explanation of the essential elements of the present invention.

Before considering in detail the various ramifications of the present invention, it is convenient to define several of the terms, phrases, and conventions used in the specification and the claims. The phrase "gasoline boiling range" as used herein refers to a temperature range having an upper limit of about 400° F. to about 425° F. The term "naphtha" refers to a selected fraction of a gasoline boiling range distillate and will generally have an initial boiling point of from about 150° F. to about 250° F. and an end boiling point within the range of about 350° F. to about 425° F. The phrase "hydrocarbon charge stock" is intended to refer to a portion of a petroleum crude oil, a mixture of hydrocarbons, of a coal tar distillate, of a shale oil, etc., that boils within a given temperature range. The expression "sulfur entering the reforming zone" means the total quantity of equivalent sulfur entering the reforming zone from any source as elemental sulfur or in sulfur-containing compounds. The amounts of sulfur given herein are calculated as weight parts of equivalent sulfur per million weight parts of charge stock (p.p.m.), and are reported on the basis of the elemental sulfur even though the sulfur is present as a compound. The phrase "substantially water-free" refers to the situation where the total water and water-producing compounds entering the reforming zone from any source is at least less than 20 p.p.m. by weight of equivalent water based on the hydrocarbon charge stock. The term "selectivity" when it is applied to a reforming process refers to the ability of the process to make hydrogen and $C_5^+$ yield and to inhibit $C_1$–$C_4$ yield. The term "activity" when it is applied to reforming processes refers to the ability of the process, at a specified severity level, to produce a $C_5^+$ product of the required quality as measured by octane number. The term "stability" when it is applied to the reforming process means the rate of change with time of the operation parameters associated with the process; for instance, a common measure of stability is the rate of change of reactor temperature that is required to maintain a constant octane number in output $C_5^+$ product—the smaller slope implying the more stable process. The "liquid hourly space velocity" (LHSV) is defined to be the equivalent liquid volume of the charge stock flowing through the bed of catalyst per hour divided by the volume of the catalyst bed. A time period of one BPP is the amount of time, at a fixed charge rate, necessary to process 1 barrel of charge per pound of catalyst contained in the conversion zone.

The hydrocarbon charge stock that is reformed in accordance with the process of the present invention is generally a hydrocarbon fraction containing naphthenes and paraffins. The preferred charge stocks are those consisting essentially of naphthenes and paraffins although in some cases aromatics may also be present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasoline can also be used. The gasoline charge stock may be a full boiling range gasoline having an initial boiling point of from about 50° F. to about 100° F. and an end boiling point within the range of from about 325 to 425° F., or may be a selected fraction thereof which usually will be a higher boiling fraction commonly referred to as a heavy naphtha. It is also within the scope of the present invention to charge pure hydrocarbons or mixtures of hydrocarbons, usually paraffins or naphthenes, which it is desired to convert to aromatics.

The charge stock must be carefully controlled in the areas of concentration of sulfur-containing compounds, nitrogen-containing compounds, and of concentration of oxygen-containing compounds. In general, it is preferred that the concentration of all of these constituents be reduced to very low levels by any suitable pretreating method such as a mild hydrogenation treatment with a suitable supported catalyst such as a cobalt and/or molybdenum catalyst. This is not to be construed to exclude the possibility that the concentration of sulfur-containing compounds in the charge stock could be carefully adjusted in order to furnish the required amount of sulfur to the reaction environment; but this latter method is difficult to control and is, consequently, not preferred. In any event, it is necessary that the total concentration of water and of water-yielding compounds be reduced to at least 20 p.p.m., calculated as equivalent water, and preferably substantially less than this.

Additionally, the amount of ammonia-yielding compounds contained in the charge stock must be carefully controlled. For purposes of the present invention it is essential that the reforming zone be operated in a substantially ammonia-free condition. That is, the amount of ammonia or ammonia-yielding compounds continuously entering the reforming zone must be maintained substantially less than that equivalent to 1 wt. p.p.m. of the hydrocarbon charge stock, calculated as elemental nitrogen. This limitation on nitrogen entering the reforming zone is ordinarily easily achieved by limiting the amount of nitrogen compounds contained in the charge stock to less than 1 wt. p.p.m. by a suitable pre-treatment method such as a hydrodesulfurization treatment, hydrorefining treatment, or the like treatment.

In general, it is preferred to first reduce the sulfur concentration of the feed to very low levels, and thereafter inject into the reforming zone a controlled amount of sulfur or sulfur-containing compound. Any reducible sulfur-containing compound, that does not contain oxygen, which is converted to hydrogen sulfide by reaction with hydrogen at conditions in the reforming zone may be used. This class includes: aliphatic mercaptans such as ethyl mercaptan, propyl mercaptans, tertiary butyl mercaptan, etc.; aromatic mercaptans such as thiophenol and derivatives; cycloalkane mercaptans such as cyclohexyl mercaptan; aliphatic sulfides such as ethyl sulfide; aromatic sulfides such as phenyl sulfide; aliphatic disulfides such as tertiary butyl disulfide; aromatic disulfides such as phenyl disulfide; dithioacids; thioaldehydes; thioketones heterocyclic sulfur compounds such as the thiophenes and thiophanes; etc. In addition, free sulfur or hydrogen sulfide may be used if desired. Usually, mercaptan such as tertiary butyl mercaptan is the preferred additive for reasons of cost and convenience.

Regardless of which sulfur additive is used, it is clear that it may be added directly to the reforming zone independently of any input stream, or that it may be added to either the charge stock or the hydrogen stream or both of these. For example, one acceptable method would involve the addition of hydrogen sulfide to the hydrogen stream. However, the preferred procedure involves the admixture of the sulfur additive with the charge stock prior to its passage into the reforming zone.

The amount of sulfur entering the reforming zone at any given time is a function of residual sulfur in the charge stock, the amount of sulfur added to the charge stock, the amount of sulfur in the hydrogen stream, and the amount added directly to the zone. Regardless of the source of the sulfur entering the reforming zone, it is an essential feature of the present invention that this amount be carefully controlled according to the following three-step program. The first step involves establishing the total amount of sulfur entering the reforming zone at a first value selected from the range equivalent to about 1000 to about 5000 wt. p.p.m. of the hydrocarbon charge stock. This relatively high amount of sulfur is established during a first period of operation of the subject process when it is being started up and lined-out. For a commercial reforming operation the duration of this step is ordinarily about 3 to about 14 days with 5 days being the typical period. Measured on a barrels of charge per pound of reforming catalyst basis for a typical reforming catalyst having an apparent bulk density of about 32 pounds of catalyst per cubic foot, this period is ordinarily about 0.5 to about 2 BPP for a liquid hourly space velocity of about 1 hr.$^{-1}$. For higher liquid hourly space velocities, these last numbers are reduced proportionately.

After this relatively high amount of sulfur is established, the second step of the present invention involves decreasing the amount of sulfur entering the reforming zone to a second value equal to about 10 to about 25% of the first value established in the first period. For example, if the amount of sulfur established in the first period is 2000 wt. p.p.m., then in the second period it would be decreased to a value of about 200 to about 500 wt. p.p.m. of sulfur. The duration of this second period, measured on a barrels of charge per pound of catalyst basis, is at least 2 BPP and more typically about 4 to about 10 BPP. This time interval for a typical reforming catalyst having an apparent bulk density of about 32 pounds per cubic feet corresponds to a period of at least 15 days and more typically 28 to 70 days at a liquid hourly space velocity of 1 hr.$^{-1}$ and to at least 3 days and more typically 5.6 to about 14 days at a liquid hourly space velocity equal to about 5 hr.$^{-1}$. Since the operation of the process of the present invention at a liquid hourly space velocity greater than 5 is not contemplated, the time interval for the second period is in all cases greater than 3 days and more typically for a preferred space velocity of about 0.75 to about 3 hr.$^{-1}$ is about 1 month. Regarding the method used to decrease the amount of sulfur entering the reforming zone during this second step, the exact procedure is subjected to some choice. One acceptable method simply involves the controlled reduction of the amount of sulfur additive being incorporated in the charge stock entering the reforming zone. Another acceptable method involves the controlled scrubbing of H$_2$S out of the recycle hydrogen stream either by scrubbing all of the sulfur out of an increasing portion of the recycle gas or by scrubbing an increasing portion of the H$_2$S out of all of the recycle hydrogen stream. In some cases a combination of both techniques may be advantageous. Irrespective of what method is used to decrease the amount of sulfur entering the reforming zone, it is essential that it be done in a relatively continuous fashion. That is, the amount of sulfur should be decreased in relatively small steps, the magnitude of which are proportioned to the rate at which carbonaceous material builds up on the surface of the catalyst. In fact, a preferred procedure involves decreasing the amount of sulfur at a rate proportioned to the rate of deactivation of the reforming catalyst or measured by the rate of conversion temperature increase necessary to maintain octane number of product reformate.

Following this second period wherein the amount of sulfur entering the reforming zone is decreased, the third essential step of the present invention involves maintaining, for the duration of the reforming operation, the amount of sulfur entering the reforming zone at the constant value equal to the value attained at the end of this second step. More precisely, it is an essential feature of the present invention that the amount of sulfur be continuously maintained at the relatively small amount achieved at the end of the second step for the duration of the reforming operation. This is to guard against the very rapid deactivation that occurs in a low pressure, continuous reforming system when the protective presence of sulfur is completely withdrawn. Thus the amount of sulfur entering the reforming zone is maintained at at least 100 wt. p.p.m. for the duration of the reforming operation.

As hereinbefore indicated, the reforming catalyst utilized contains a platinum group component. Typically, this component is combined with a suitable refractory inorganic oxide carrier material such as alumina, silica, zirconia, magnesia, boria, thoria, titania, strontia, etc., and mixtures of two or more including silica-alumina, alumina-boria, silica-alumina-zirconia, etc. It is understood that these refractory inorganic oxides may be manufactured by any suitable method including separate, successive, or coprecipitation methods of manufacture, or they may be naturally-occurring substances such as clays, or earths which may or may not be purified or activated with special treatment. The preferred carrier material comprises a porous, adsorptive, high surface area alumina support having a surface area of about 25 to 500 or more m.$^2$/gm. Suitable alumina materials are the crystalline aluminas known as gamma-, eta-, and theta-alumina, with gamma-alumina giving best results. In addition, in some embodiments the preferred alumina carrier material may contain minor proportions of other well known refractory inorganic oxides such as silica, zirconia, magnesia, etc. However, the preferred carrier material is substantially pure gamma-alumina. In fact, an especially prefrred carrier material has an apparent bulk density of about 0.30 to about 0.70 gm./cc. and has surface area characteristics such that the average pore diameter is about 20 to about 300 Angstroms, the pore volume is about 0.10 to about 1.0 ml./gm. and the surface area is about 100 to about 500 m.$^2$/gm. A preferred method for manufacturing this alumina carrier material is given in U.S. Pat. No. 2,620,314.

Another constituent of the reforming catalyst is a halogen component. Although the precise form of the chemistry of the association of the halogen component with the alumina carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and chlorine are preferred for the purposes of the present invention. The halogen may be added to the alumina support in any suitable manner, either before, during, or after the addition of the other components. For example, the halogen may be added as an aqueous solution of an acid such as hydrogen fluoride, hydrogen chloride, hydrogen bromide, etc. In addition, the halogen or a portion thereof may be composited with the alumina during the impregnation of the latter with the platinum group component; for example, through the utilization of a mixture of chloroplatinic acid and hydrogen chloride. In another situation, the alumina hydrosol which is typically utilized to form the alumina carrier material may contribute at least a portion of the halogen component to the final composite. In any event, the halogen will be typically composited in such a manner as to result in a final composite containing about 0.1 to about 1.5 wt. percent, and preferably about 0.4 to about 1 wt. percent of halogen calculated on an elemental basis.

As indicated above, the reforming catalyst must contain a platinum group component. Although the preferred catalyst contains platinum or a compound of platinum, it is intended to include other platinum group metals such as palladium, rhodium, ruthenium, osmium, and iridium. The platinum group metallic component, such as platinum, may exist within the final catalytic composite as a compound such as an oxide, sulfide, halide, etc., or as an elemental metal. Generally, the amount of the platinum group metallic component present in the final catalyst is small compared to the quantities of the other components combined therewith. In fact, the platinum group metallic component generally comprises about 0.01 to about 3 wt. percent of the final catalyst, calculated on an elemental basis. Excellent results are obtained when the catalyst contains about 0.1 to about 2 wt. percent of the platinum group metal.

The platinum group component may be incorporated in the catalytic composite in any suitable manner such as coprecipitation or cogellation with the alumina support, ion-exchange with the alumina support and/or alumina hydrogel, or impregnation of the alumina support at any stage in its preparation either before, during, or after its calcination treatment. The preferred method of preparing the catalyst involves the utilization of a soluble, decomposable compound of a platinum group metal to impregnate the alumina support. Thus, the platinum group metal may be added to the alumina support by commingling the latter with an aqueous solution of chloroplatinic acid or an equivalent compound.

Following the platinum and halogen impregnation, the impregnated alumina carrier material is typically dried and subjected to a conventional high temperature calcination or oxidation technique to obtain an oxidized composite of a halogen component and a platinum group component with an alumina carrier material. Similarly, additional treatments such as prereduction and/or presulfiding may be performed on the resulting oxidized composite if desired.

It is understood that the reforming catalyst may be manufactured in any suitable manner and that the precise method of manufacture is not considered to be a limiting feature of the present invention. Likewise, it is understood that the catalyst may be present in any desired shape, such as: spheres, pills, pellets, extrudates, powder, etc. Additional details on preferred catalysts for the process of the present invention are given in U.S. Pat. Nos. 2,479,109 and 3,296,119.

According to the present invention, the hydrocarbon charge stock, hydrogen, and sulfur or a sulfur-containing compound are continuously contacted in a substantially water-free reforming zone with a reforming catalyst containing a platinum group component at reforming conditions. This reforming step may be accomplished in a fixed bed system, a moving bed system, a fluidized system, or in a batch type operation; however, in view of the danger of attrition losses of the valuable catalyst and of well known operational advantages, it is preferred to use a fixed bed system. In this system, a hydrogen-rich stream and the charge stock are preheated, by any suitable heating means, to the desired reaction temperature and then are passed in admixture with sulfur or a sulfur-containing compound, into a reforming zone containing a fixed bed of the catalyst. It is, of course, understood that the reforming zone may be one or more separate reactors with suitable heating means therebetween to insure that the desired conversion temperature is maintained at the entrance to each reactor. It is also to be noted that the reactants are typically in vapor phase and may be contacted with the catalyst bed in either upward, downward, or radial flow fashion with the latter being preferred.

Another essential feature of the present invention is that the reforming zone is maintained substantially water-free. To achieve and maintain this condition, it is necessary to control the water initially present in the reforming zone and the water level present in the charge stock and the hydrogen stream which are charged to the reforming zone. It is essential that the equivalent water entering the reforming zone from all sources be held to a level less than that equal to 20 wt. p.p.m. In general, this can be accomplished by predrying the reforming zone with a suitable circulating dry gas such as dry hydrogen and by continuously drying the charge stock with any suitable drying means known to the art such as a conventional solid adsorbent having a high selectivity for water, for instance, silica gel, activated alumina, calcium or sodium crystalline aluminosilicates, anhydrous calcium sulfate, high surface area sodium, and the like adsorbents. Similarly, the water content of the charge stock may be adjusted by suitable stripping operations in a fractionation column or like device. And in some cases a combination of adsorbent drying and distillation drying may be used advantageously to effect almost total removal of water from the charge stock. Additionally, it is preferred to continuously dry the hydrogen stream entering the hydrocarbon conversion zone down to a level of about 10 vol. p.p.m. of water or less. This can be conveniently accomplished by contacting the hydrogen stream with any suitable adsorbent such as the ones mentioned above. The preferred drying means for both charge stock and the hydrogen stream is calcium aluminosilicate molecular sieves having a pore size of about 5 Angstroms.

Regardless of the details of the operation of the reforming step, an effluent stream is continuously withdrawn from the reforming zone, cooled in a conventional cooling means and typically passed to a separating zone wherein a hydrogen-rich vapor phase separates from a hydrocarbon-rich liquid phase. A hydrogen-rich stream is then withdrawn from the separating zone and a portion of it vented from the system in order to remove the net hydrogen production and to maintain pressure control. Typically another portion of this withdrawn hydrogen stream is recycled via compressing means to the reforming step. Similarly, the hydrocarbon-rich liquid phase is withdrawn and typically passed to a suitable fractionation zone wherein a $C_1$ to $C_4$ product is taken overhead and a $C_5^+$ product recovered as bottoms.

It is within the scope of the present invention to operate with a once-through hydrogen stream, but the preferred procedure is to recycle a hydrogen stream recovered from the effluent stream as indicated above. In this last mode, the recycle hydrogen stream can be selectively treated to remove $H_2O$ without removing $H_2S$ by using a suitable selective adsorbent (e.g., see U.S. Pat. No. 3,201,343); however, this procedure requires the calculation of the equilibrium level of sulfur that will enter the reforming zone with the hydrogen stream for a given sulfur input in the charge stock so that the total quantity of sulfur entering the reforming zone, in both the charge stock and hydrogen stream, is lined-out at a value in the range previously given. An alternative approach which is simpler to control is to remove substantially all $H_2O$ and $H_2S$ from the recycle hydrogen stream and control the amount of sulfur entering the reforming zone exclusively by the amount admixed with the charge stock. Another mode of operation involves the selective scrubbing of controlled amount of $H_2S$ from at least a portion of the recycled hydrogen stream in order to control the sulfur level in the reforming zone.

As indicated previously, a singular feature of the process of the present invention is the capability to operate in a stable fashion at low pressure. In the past, it has been the practice to operate at high pressure primarily to provide sufficient hydrogen to saturate hydrocarbon fragments generated during the reforming process and to prevent excessive carbon deposition on the catalyst with the attendant decline in the catalyst's activity for the upgrading reactions of interest. I have now found that a highly stable operation is achieved using the process of the present invention at pressures in the range of about 50 to about 350 p.s.i.g. and preferably about 75 to about 250 p.s.i.g. The exact selection of the operating pressure within these ranges is made primarily as a function of the characteristics of the particular charge stock and catalyst used in the process.

The temperature required in the reforming zone is generally lower than that required for a similar high pressure operation. This significant and desirable feature of the present invention is a consequence of the inherent selectivity of the low pressure operation for the octane-upgrading reactions as previously explained. In the past, when high octane was required, it was the practice to run at higher temperatures in order to produce more hydrocracking of paraffins and thus concentrate the available aromatics in the product stream; however, this high cracking is not needed to make octane in the process of the present invention. Accordingly, the present process requires a temperature in the range of about 850° F. to about 1100° F. and preferably about 900° F. to about 1050° F. As is well known to those skilled in the reforming art, the initial selection of the temperature within this broad range is made primarily as a function of the desired octane in the product reformate considering the characteristics of the charge stock and of the catalyst. Ordinarily, the temperature is increased during the run to compensate for deactivation that occurs and to provide for a constant octane product.

The process is operated at a liquid hourly space velocity in the range of about 0.1 to about 5 hr.$^{-1}$ with a value of about 0.75 to about 3 hr.$^{-1}$ being preferred. Similarly, the hydrogen necessary for the present invention is supplied to the reforming zone at about 0.5 to about 20 moles per mole of hydrocarbon in the feed. Excellent results are obtained when about 4 to about 12 moles of hydrogen are used for each mole of hydrocarbon in the feed stock.

An extraordinary feature of the process of the present invention is the infrequency with which the catalyst must be regenerated. Previously, low pressure operations have required extensive regenerating facilities if the associated catalyst is to be used for an economic period of time. The process of the present invention, since it operates for at least a catalyst life of 15 BPP and more typically, 25 BPP to 100 BPP, without any regeneration can be built without extensive regenerating facilities, such as swing bed reactors, thereby effecting great savings in initial investment. For example, for a typical reforming catalyst having an apparent bulk density of about 12 lb./cu. ft., the improved process of the present invention would operate, for a minimum catalyst life of at least 15 BPP, which at a typical LHSV of 1 hr.$^{-1}$ corresponds to 3.7 months before any regeneration of the catalyst would be required; and depending on the charge stock and severity level utilized, it would more typically operate for a catalyst life of about 25 BPP to about 100 BPP which at a LHSV of 1 hr.$^{-1}$ corresponds to a catalyst life of about 6.15 months to about 24.6 months without any regeneration of the catalyst. An additional incentive for avoiding frequent regeneration is the substantial danger of injecting small amounts of water into the system from the regeneration operation via inefficient purging techniques once the oxidation step of the regeneration cycle is completed. As previously discussed, the presence of even small quantities of water in the system can jeopardize the stability of the process; accordingly, stringent precaution must be taken to insure that the reforming zone is substantially free from water after its infrequent regeneration operations are performed.

The following example is given to illustrate further the improvement of the present invention and to indicate the benefits to be afforded through the utilization thereof. It is understood that the example is given for the sole purpose of illustration, and is not to be considered to limit unduly the generally broad scope and spirit of the claims.

EXAMPLE I

This example demonstrates the beneficial effects of the improved method of operation of the present invention by contrasting the results obtained in a run made with programmed sulfur addition, with the results obtained in a similar run made with a constant amount of sulfur continuously entering the reforming zone throughout the duration of the reforming operation.

A catalyst was prepared using 1/16 inch alumina spheres manufactured in accordance with U.S. Pat. No. 2,620,314. The resulting spheres were impregnated with an aqueous solution of chloroplatinic acid and hydrogen chloride. The impregnated spheres were then dried at a relatively low temperature, and thereafter subjected to a high temperature oxidation treatment in the presence of air at a temperature of about 1000° F. The resulting oxidized catalytic composite was then subjected to a high temperature treatment in a hydrogen stream at a temperature of about 1000° F. for about 1 hour. Thereafter, the resulting reduced catalyst was subjected to a high temperature sufiding treatment with a gas stream comprising hydrogen and hydrogen sulfide. The resulting catalytic composite contained, on an elemental basis, about 0.75 wt. percent platinum, about 0.9 wt. percent chloride, and about 0.1 wt. percent sulfur.

The charge stock for this example was a Mid-continental naphtha having the properties shown in Table I.

TABLE I.—ANALYSIS OF CHARGE STOCK

| | |
|---|---|
| Gravity ° API at 60° F. | 56.4 |
| Distillation curve profile, ° F.: | |
| IBP | 208 |
| 10% | 228 |
| 30% | 242 |
| 50% | 262 |
| 70% | 290 |
| 90% | 326 |
| 95% | 344 |
| EBP | 382 |
| Sulfur, wt. p.p.m. | 1.3 |
| Water, wt. p.p.m. | 2 |
| Nitrogen, wt. p.p.m. | 0.1 |
| Paraffin, vol. percent | 46 |
| Naphthenes, vol. percent | 48 |
| Aromatics, vol. percent | 6 |
| Octane number, F–1 clear | 46.2 |

The reforming plant utilized in the test runs was a laboratory scale model comprising a single reforming reaction zone, a hydrogen separating zone, and a debutanizer column. In this plant the charge stock and a hydrogen stream were heated to the desired conversion temperature by a suitable heating means and passed into the reforming reaction zone which contained a fixed bed of the reforming catalyst. An effluent stream was withdrawn from the reforming zone and passed to the hydrogen separating zone through a suitable cooling means designed to lower the temperature of this stream to about 100° F. In this hydrogen separating zone, a hydrogen-rich phase was separated from a hydrocarbon-rich liquid phase. The hydrogen-rich phase was then withdrawn from this zone, a portion of it vented from the system as excess recycle gas, and the remainder recycled through suitable compressive means to the reforming reaction zone. Likewise, the liquid phase from this separating zone was withdrawn and passed to a debutanizer column wherein light ends were taken overhead and a $C_5^+$ bottoms product recovered. In this plant, the portion of the hydrogen stream that is recycled was treated in a scrubbing zone containing an adsorbent material to remove substantially all water therefrom. The adsorbent used was selective for $H_2O$ and did not substantially effect the concentration of $H_2S$ contained in this hydrogen stream. Therefore, for this plant the recycle hydrogen stream was a substantial source of sulfur entering the reforming zone. In fact, the small amount of sulfur present in the charge stock accumulated in this hydrogen recycle stream until an equilibrium value was reached wherein the amount of sulfur withdrawn from the system, in the excess recycle gas and dissolved in the liquid phase withdrawn from the hydrogen separating zone, equaled the amount present in the charge stock. Since the total amount of sulfur circulating in the hydrogen stream is an amount substantially in excess of that injected in the hydrocarbon charge stock, it required a substantial period of time to line-out the sulfur entering the reforming zone and to build up the sulfur inventory in the system. Calculations for this plant indicated that the presence of 1 wt. p.p.m. of sulfur in the charge stock was equivalent at equilibrium, to a total amount of sulfur entering the reforming zone of about 4 wt. p.p.m. It is to be noted that because of this sulfur inventory in this plant, the amount of sulfur entering the reforming zone did not respond directly to changes in the amount contained in the charge stock, but required a substantial period of time for a new equilibrium sulfur level to be established.

In order to clearly contrast the improved operation of the present invention, two separate reforming runs were made with separate portions of the reforming catalyst. The first run, Run A, was run in accordance with the present invention with programmed sulfur addition. In the first step of the program, the total amount of sulfur entering the reforming zone was lined-out, during a start-up period of 2 BPP, at 4000 wt. p.p.m.; and thereafter it was decreased, during a period corresponding to a catalyst life of 4 BPP, to 200 wt. p.p.m. This decrease in sulfur level was accomplished by dropping the amount of sulfur contained in the charge stock from 1000 wt. p.p.m. to 200 wt. p.p.m. at a catalyst life of about 2 BPP (i.e. 7 days for a LHSC=2 hr.$^{-1}$; thereafter the amount of sulfur contained in the charge stock was further decreased to 50 wt. p.p.m. at a catalyst life of about 4 BPP (i.e. 14 days for a LHSV=2 hr.$^{-1}$). Following a transition period of about 2 BPP in which a new sulfur equilibrium was established, these changes in the amount of sulfur present in the charge stock resulted in the equilibrium values for the total amount of sulfur entering the reforming zone given in Table II.

TABLE II.—EQUILIBRIUM SULFUR LEVELS FOR TESTS

Run A—Programmed sulfur addition

| Time on stream, BPP: | Sulfur level, wt. p.p.m. |
|---|---|
| 0–2 | 4000 |
| 2–4 | 800 |
| 4–6 | 200 |
| 6–end of run | 200 |

Run B—Control run

| | |
|---|---|
| Time on stream, BBP—0–end of run | 800 |

Run B, on the other hand, was the control run wherein the plant was lined-out and thereafter maintained at an equilibrium value of total sulfur entering the reforming zone of 800 wt. p.p.m. In both cases the sulfur levels in the charge stock were established by blending t-heptyl mercaptan in the required amounts. In addition, in both cases t-butyl chloride was added to the charge stock in an amount of about 1.5 wt. p.p.m.

In both cases the reforming plant was pre-dried to less than 10 vol. p.p.m. water by circulating a dry hydrogen stream before the plant was started-up. During the course of both runs, the total amount of water entering the reforming zone was maintained at a value substantially less than 5 wt. p.p.m. of the hydrocarbon charge stock. The reforming conditions utilized in both cases were identical, and they were: a pressure of 200 p.s.i.g., a liquid hourly space velocity of 2 hr.$^{-1}$, and a hydrogen to hydrocarbon mole ratio of 8:1. Likewise, the conversion temperature maintained in the reforming zone was continuous adjusted in both cases to result in a $C_5^+$ reformate having an octane number of 100 F–1 clear.

The results of this comparison test are given in Table III in terms of the weight percent yield of the $C_1+C_2$ and the $C_3+C_4$ fractions; of the volume percent yield of the $C_5^+$ fraction, the $C_6^+$ fraction and the aromatic fraction; and of the excess recycle hydrogen make in standard cubic feet per barrel. These measurements were made at a catalyst life of 1 BPP and again at a catalyst life of 5 BPP. The difference over this 4 BPP period is also presented in Table III.

TABLE III.—COMPARISON OF RESULTS

Run A—Programmed sulfur addition

| Time on stream, BPP | $C_1+C_2$, wt. percent | $C_3+C_4$, wt. percent | $C_5+$, vol. percent | $C_6+$, vol. percent | Aromatic, vol. percent | $H_2$ make, s.c.f.b. |
|---|---|---|---|---|---|---|
| 1 | 4.2 | 6.7 | 79.8 | 75.0 | 56.3 | 1,492 |
| 5 | 4.6 | 7.3 | 78.8 | 74.2 | 56.0 | 1,400 |
| Change /BPP | +0.1 | +0.15 | −0.25 | −0.20 | −0.07 | −23 |

Run B—Control run

| Time on stream, BPP | $C_1+C_2$, wt. percent | $C_3+C_4$, wt. percent | $C_5+$, vol. percent | $C_6+$, vol. percent | Aromatic, vol. percent | $H_2$ make, s.c.f.b. |
|---|---|---|---|---|---|---|
| 1 | 3.2 | 5.2 | 80.5 | 77.3 | 54.8 | 1,530 |
| 5 | 5.0 | 7.2 | 78.7 | 74.2 | 54.2 | 1,410 |
| Change/BPP | +0.45 | +0.50 | −0.45 | −0.78 | −0.15 | −30 |

With reference to the data presented in Table III, it is evident that the principal effect of programmed sulfur addition in this system was to stabilize the yields of the various products of the reforming reaction. Specifically, the $C_5+$ yield decline rate was changed from −0.45 vol. percent/BPP to −0.25 vol. percent/BPP. This is a decrease of about 40% in the instability of this very significant parameter. Likewise, the rate of decay of the hydrogen production was changed from a −30 SCFB/BPP to −23 SCFB/BPP which again is indicative of the stability feature of the present invention.

In sum, these results manifest the capability of the present invention to stabilize the yield structure of a low pressure, continuous reforming system operated with sulfur inclusion and water exclusion.

I claim as my invention:

1. In a catalytic, low pressure process for continuously reforming a hydrocarbon charge stock boiling in the gasoline range for a catalyst life of at least 15 barrels of charge per pound of catalyst without catalyst regeneration; wherein the hydrocarbon charge stock, hydrogen, and sulfur or a sulfur-containing compound are continuously contacted, in a reforming zone, with a reforming catalyst containing a platinum group component at reforming conditions, including a pressure of about 50 to about 350 p.s.i.g. and a liquid hourly space velocity of about 0.1 to about 5 hr.$^{-1}$; wherein the reforming zone is maintained substantially free of water and of ammonia throughout the reforming operation; and wherein the sulfur of sulfur-containing compound is continuously introduced into the reforming zone both during start-up of the process and thereafter for the duration of the reforming operation; the improved method of operation comprising the steps of:
   (a) starting up the process, in a first period sufficient to lineout the reforming operation, and establishing the amount of sulfur continuously entering the reforming zone at a first value selected from the range equivalent to about 1000 to about 5000 weight p.p.m. of the hydrocarbon charge stock;
   (b) thereafter, decreasing the amount of sulfur entering the reforming zone, during a second period of at least 2 barrels of charge per pound of catalyst, to a second value equal to about 10 to about 25% of said first value, the duration of said second period being at least 3 days; and,
   (c) thereafter, for the duration of the reforming operation, maintaining the amount of sulfur entering the reforming zone at a constant value equal to said second value.

2. An improved process as defined in claim 1 wherein at least a portion of the sulfur enters the reforming zone in the form of a reducible sulfur-containing compound contained in the hydrocarbon charge stock.

3. An improved process as defined in claim 2 wherein the amount of sulfur entering the reforming zone in the second period is reduced by decreasing the amount of the reducible sulfur-containing compound contained in the charge stock.

4. An improved process as defined in claim 1 wherein an effluent stream is withdrawn from the reforming zone, cooled, and separated into a hydrogen-rich gaseous phase containing $H_2S$ and a liquid hydrocarbon phase, wherein at least a portion of the hydrogen-rich gaseous phase is recycled to the reforming zone, and wherein the amount of sulfur entering the reforming zone in the second period is decreased by scrubbing controlled amounts of $H_2S$ from at least a portion of this hydrogen recycle stream.

5. An improved process as defined in claim 1 wherein the duration of said second period is about 4 to about 10 barrels of charge per pound of catalyst.

6. An improved process as defined in claim 1 wherein said reforming catalyst comprises a combination of catalytically effective amounts of a platinum component and a halogen component with a refractory inorganic oxide.

7. An improved process as defined in claim 6 wherein said refractory inorganic oxide is alumina.

8. An improved process as defined in claim 6 wherein said halogen component is chlorine or a compound of chlorine.

9. An improved process as defined in claim 1 wherein the amount of sulfur entering the reforming zone in said second period is decreased at a rate proportioned to the rate of deactivation of said reforming catalyst as measured by rate of conversion temperature increase necessary to maintain octane number of product reformate.

References Cited

UNITED STATES PATENTS

| 2,952,611 | 9/1960 | Haxton et al. | 208—138 |
| 3,067,130 | 12/1962 | Baldwin et al. | 208—138 |
| 3,201,343 | 8/1965 | Bicek | 208—138 |
| 3,234,120 | 2/1966 | Capsuto | 208—138 |
| 3,330,761 | 7/1967 | Capsuto et al. | 208—138 |

HERBERT LEVINE, Primary Examiner

U.S. Cl. X.R.

208—139